(12) United States Patent
Wiklund et al.

(10) Patent No.: US 6,725,731 B2
(45) Date of Patent: Apr. 27, 2004

(54) BI-DIRECTIONAL DIFFERENTIAL PRESSURE FLOW SENSOR

(75) Inventors: David E. Wiklund, Eden Prairie, MN (US); Terrance F. Krouth, Eden Prairie, MN (US); David A. Broden, Andover, MN (US); Mark S. Schumacher, Minneapolis, MN (US)

(73) Assignee: Rosemount Inc., Eden Prairie, MN (US)

(*) Notice: Subject to any disclaimer, the term of this patent is extended or adjusted under 35 U.S.C. 154(b) by 0 days.

(21) Appl. No.: 10/289,149

(22) Filed: Nov. 6, 2002

(65) Prior Publication Data

US 2003/0136196 A1 Jul. 24, 2003

Related U.S. Application Data

(63) Continuation of application No. 09/521,537, filed on Mar. 8, 2000, now abandoned.

(51) Int. Cl.[7] .................................................. G01F 1/37
(52) U.S. Cl. .................................. 73/861.52; 73/861.58
(58) Field of Search ......................... 73/861.52, 861.58, 73/861.61, 861.63, 861.64

(56) References Cited

U.S. PATENT DOCUMENTS

| | | |
|---|---|---|
| 1,480,661 A | 1/1924 | Brown |
| 1,698,314 A | 1/1929 | Mapelsden |
| 2,943,640 A | 7/1960 | James .................. 137/594 |
| 3,160,836 A | 12/1964 | Farley .................. 336/30 |
| 3,388,597 A | 6/1968 | Bargen et al. ............. 73/398 |

(List continued on next page.)

FOREIGN PATENT DOCUMENTS

| | | |
|---|---|---|
| DE | 31 16333 A1 | 4/1981 |
| DE | 3244668 | 6/1984 |
| DE | 4220333 | 12/1993 |

(List continued on next page.)

OTHER PUBLICATIONS

U.S. patent application Ser. No. 09/395,688, Kleven, filed Sep. 13, 1999.
U.S. patent application Ser. No. 09/394,728, Kleven, filed Sep. 13, 1999.

Primary Examiner—Harshad Patel
(74) Attorney, Agent, or Firm—Westman, Champlin & Kelly, P.A.

(57) ABSTRACT

Disclosed is a bi-directional differential pressure flow sensor that is configured to establish a direction and flow rate of a fluid flow. The flow sensor includes a flow restriction member, a differential pressure sensor, and processing electronics. The flow restriction member is configured to produce a pressure drop when placed inline with the fluid flow. The differential pressure sensor is embedded or integral with the flow restriction member and produces a differential pressure signal that is indicative of the pressure drop. The processing electronics produces a flow rate signal that is indicative of the direction and flow rate of the fluid flow as a function of the differential pressure signal.

26 Claims, 12 Drawing Sheets

U.S. PATENT DOCUMENTS

| | | | | |
|---|---|---|---|---|
| 3,430,489 | A | 3/1969 | Pfrehm | 73/231 |
| 3,494,190 | A | 2/1970 | Schwartzman | 73/228 |
| 3,561,831 | A | 2/1971 | Alibert et al. | 310/8.7 |
| 3,657,925 | A | 4/1972 | Gross | 73/239 |
| 3,678,754 | A | 7/1972 | Amir et al. | 73/419 |
| 3,727,520 | A | 4/1973 | McKown et al. | 91/433 |
| 3,817,283 | A | 6/1974 | Hewson | |
| 3,958,492 | A | 5/1976 | Curless | 91/363 R |
| 4,031,813 | A | 6/1977 | Walters et al. | 91/433 |
| 4,100,798 | A | 7/1978 | Nilsson et al. | 73/194 E |
| 4,126,047 | A | 11/1978 | Sethares et al. | 73/505 |
| 4,193,420 | A | 3/1980 | Hewson | 137/356 |
| 4,205,592 | A | 6/1980 | Haüssler | 91/449 |
| 4,249,164 | A | 2/1981 | Tivy | 340/870.3 |
| 4,275,793 | A | 6/1981 | Schivley, Jr. et al. | 173/9 |
| 4,304,136 | A | 12/1981 | McCabe et al. | 73/861.54 |
| 4,319,492 | A | 3/1982 | Hewson et al. | 73/756 |
| 4,381,699 | A | 5/1983 | Haussler | 91/433 |
| 4,424,716 | A | 1/1984 | Boehringer et al. | 73/861.56 |
| 4,436,348 | A | 3/1984 | Farr | 303/115 |
| 4,466,290 | A | 8/1984 | Frick | 73/756 |
| 4,520,660 | A | 6/1985 | Hitchcock | 73/120 |
| 4,539,967 | A | 9/1985 | Nakajima et al. | 123/585 |
| 4,543,649 | A | 9/1985 | Head et al. | 367/96 |
| 4,545,406 | A | 10/1985 | King | 137/553 |
| 4,557,296 | A | 12/1985 | Byrne | 138/44 |
| 4,584,472 | A | 4/1986 | Wiblin et al. | 250/237 G |
| 4,585,021 | A | 4/1986 | Belknap | 137/100 |
| 4,588,953 | A | 5/1986 | Krage | 324/58.5 C |
| 4,631,478 | A | 12/1986 | Knetsch et al. | 324/207 |
| 4,671,166 | A | 6/1987 | Glaze et al. | 91/361 |
| 4,689,553 | A | 8/1987 | Haddox | 324/58.5 C |
| 4,737,705 | A | 4/1988 | Bitar et al. | 324/58.5 C |
| 4,742,794 | A | 5/1988 | Hagstrom | 114/286 |
| 4,744,218 | A | 5/1988 | Edwards et al. | 60/368 |
| 4,745,810 | A | 5/1988 | Pierce et al. | 73/706 |
| 4,749,936 | A | 6/1988 | Taplin | 324/58.5 B |
| 4,751,501 | A | 6/1988 | Gut | 340/607 |
| 4,757,745 | A | 7/1988 | Taplin | 91/361 |
| 4,774,465 | A | 9/1988 | Nilius | 324/208 |
| 4,841,776 | A | 6/1989 | Kawachi et al. | 73/706 |
| 4,866,269 | A | 9/1989 | Wlodarczyk et al. | 250/231 |
| 4,901,628 | A | 2/1990 | Krage | 92/5 R |
| 4,932,269 | A | 6/1990 | Cammarata, III et al. | 73/861.61 |
| 4,938,054 | A | 7/1990 | Dye et al. | 73/3 |
| 4,961,055 | A | 10/1990 | Habib et al. | 324/662 |
| 4,987,823 | A | 1/1991 | Taplin et al. | 91/361 |
| 5,000,650 | A | 3/1991 | Brewer et al. | 414/699 |
| 5,031,506 | A | 7/1991 | Baisch et al. | 91/363 R |
| 5,036,711 | A | 8/1991 | Good | 73/861.66 |
| 5,072,198 | A | 12/1991 | Taplin et al. | 333/33 |
| 5,085,250 | A | 2/1992 | Kendrick | 138/44 |
| 5,104,144 | A | 4/1992 | Bethell | 280/707 |
| 5,150,049 | A | 9/1992 | Schuetz | 324/207.12 |
| 5,150,060 | A | 9/1992 | Bitar | 324/635 |
| 5,182,979 | A | 2/1993 | Morgan | 92/5 R |
| 5,182,980 | A | 2/1993 | Greer | 92/5 R |
| 5,218,820 | A | 6/1993 | Sepehri et al. | 60/463 |
| 5,218,895 | A | 6/1993 | Lukich et al. | 91/361 |
| 5,233,293 | A | 8/1993 | Huang et al. | 324/207.15 |
| 5,241,278 | A | 8/1993 | Bitar | 324/635 |
| 5,247,172 | A | 9/1993 | Riemer | 250/227.21 |
| 5,260,665 | A | 11/1993 | Goldberg et al. | 324/636 |
| 5,274,271 | A | 12/1993 | McEwan | 307/108 |
| 5,313,871 | A | 5/1994 | Kaneko et al. | 91/361 |
| 5,325,063 | A | 6/1994 | Morgan | 324/636 |
| 5,332,938 | A | 7/1994 | McEwan | 307/572 |
| 5,345,471 | A | 9/1994 | McEwan | 375/1 |
| 5,361,070 | A | 11/1994 | McEwan | 342/21 |
| 5,365,795 | A | 11/1994 | Brower, Jr. | 73/861.65 |
| 5,422,607 | A | 6/1995 | McEwan | 333/20 |
| 5,424,941 | A | 6/1995 | Bolt et al. | 364/148 |
| 5,438,261 | A | 8/1995 | Codina et al. | 324/207.16 |
| 5,438,274 | A | 8/1995 | Bitar et al. | 324/636 |
| 5,455,769 | A | 10/1995 | Panoushek et al. | 364/424.07 |
| 5,457,394 | A | 10/1995 | McEwan | 324/642 |
| 5,457,960 | A | 10/1995 | Morishita | 91/361 |
| 5,461,368 | A | 10/1995 | Comer | 340/607 |
| 5,465,094 | A | 11/1995 | McEwan | 342/28 |
| 5,469,749 | A | 11/1995 | Shimada et al. | 73/861.47 |
| 5,471,147 | A | 11/1995 | Allen et al. | 324/635 |
| 5,471,162 | A | 11/1995 | McEwan | 327/92 |
| 5,479,120 | A | 12/1995 | McEwan | 327/91 |
| 5,491,422 | A | 2/1996 | Bitar et al. | 324/636 |
| 5,510,800 | A | 4/1996 | McEwan | 342/387 |
| 5,512,834 | A | 4/1996 | McEwan | 324/642 |
| 5,517,198 | A | 5/1996 | McEwan | 342/89 |
| 5,519,342 | A | 5/1996 | McEwan | 327/94 |
| 5,519,400 | A | 5/1996 | McEwan | 342/28 |
| 5,521,600 | A | 5/1996 | McEwan | 342/27 |
| 5,523,760 | A | 6/1996 | McEwan | 342/89 |
| 5,535,587 | A | 7/1996 | Tanaka et al. | 60/427 |
| 5,536,536 | A | 7/1996 | Kelley | 427/386 |
| 5,540,137 | A | 7/1996 | Lark et al. | 92/5 R |
| 5,563,605 | A | 10/1996 | McEwan | 342/202 |
| 5,573,012 | A | 11/1996 | McEwan | 128/782 |
| 5,576,498 | A | 11/1996 | Shambayati | 73/861.52 |
| 5,576,627 | A | 11/1996 | McEwan | 324/639 |
| 5,581,256 | A | 12/1996 | McEwan | 342/37 |
| 5,587,536 | A | 12/1996 | Rasmussen | 73/744 |
| 5,589,838 | A | 12/1996 | McEwan | 342/387 |
| 5,602,372 | A | 2/1997 | Strelow | 200/81.9 R |
| 5,609,059 | A | 3/1997 | McEwan | 73/290 R |
| 5,617,034 | A | 4/1997 | Lark et al. | 324/635 |
| 5,661,277 | A | 8/1997 | Graham, II | 200/81.9 R |
| 5,710,514 | A | 1/1998 | Crayton et al. | 324/635 |
| 5,773,726 | A | 6/1998 | Mahoney et al. | 73/861.65 |
| 5,817,950 | A | 10/1998 | Wiklund et al. | 73/861.66 |
| 5,861,546 | A | 1/1999 | Sagi et al. | 73/40.5 |
| 5,879,544 | A | 3/1999 | Cassidy | 210/90 |
| 5,901,633 | A | 5/1999 | Chan et al. | 92/5 R |
| 5,977,778 | A | 11/1999 | Chan et al. | 324/635 |
| 6,142,059 | A | 11/2000 | Chan et al. | 92/5 R |
| 6,269,641 | B1 | 8/2001 | Dean | 60/567 |
| 6,286,412 | B1 | 9/2001 | Manring et al. | 91/433 |

FOREIGN PATENT DOCUMENTS

| | | |
|---|---|---|
| DE | 94 17 204.8 | 10/1994 |
| DE | 0 686 831 A2 | 12/1995 |
| DE | 29616034 | 2/1997 |
| EP | 0154531 | 9/1985 |
| EP | 0 266 606 A2 | 10/1987 |
| EP | 0309643 | 4/1989 |
| EP | 0331772 | 9/1989 |
| EP | 0 887 626 A1 | 6/1998 |
| FR | 2485724 | 12/1981 |
| GB | 1080852 | 8/1967 |
| GB | 1467957 | 3/1977 |
| GB | 2011997 | 7/1979 |
| GB | 2155635 | 9/1985 |
| GB | 2 172 995 A | 10/1986 |
| GB | 2259147 | 3/1993 |
| GB | 2 301 676 | 12/1996 |
| JP | 0168106 | 10/1982 |
| JP | 57-198823 | 12/1982 |
| JP | 6160605 | 7/1986 |
| JP | 63070121 | 3/1988 |
| JP | 01207634 | 11/1989 |
| JP | 04-225126 | 8/1992 |
| JP | 0168107 | 10/1992 |

| | | |
|---|---|---|
| JP | 06-213694 | 1/1994 |
| WO | WO 96/24028 | 8/1996 |
| WO | WO 98/23867 | 6/1998 |

OTHER PUBLICATIONS

Nishimoto T. et al., article entitled "Buried Piezoresistive sensors by means of MeV ion implantation", *Sensors and Actuators*, May 1994, vol. A43, No. 1/3, pp. 249–253.

Process Instrument Engineers Handbook, Revised Edition, Chapters 2.10, 2.11, and 2.12, pp. 87–110 (1982).

Model 8800A Vortex Flowmeter, Key Differentiators (undated).

Model 1195 Integral Orifice Assembly, Rosemount Catalog pp. Flow–125 – Flow 137 (Published 1995).

Model 8800 Smart Vortex Flowmeter, Fisher–Rosemount, Managing the Process Better, pp. 2–19, (1994).

Model 8800A Smart Vortex Flowmeter, Fisher–Rosemount, Managing the Process Better, pp. 2–21 (1997).

On–Line Catalog Level and Flow Instrumentation—Flow Gauges, Industrial Process Measurement, Inc., re: RCM Industries, Inc. products, 6 pages.

Kobold, re: RCM Industries, Inc. products, pp. 13–18.

"A Physicist's Desk Reference", *American Institute of Physics*, New York, 1992, p. 201.

"Handbook of Chemistry and Physics", CRC Press, Ohio, 1975, p. E–223.

"The Electrical Engineering Handbook", Editor–in–Chief, R. Dorf, CRC Press, 1997, pp. 811–812.

Brochure: Technik, "Absolute Position Measurement Using Conducive Plastic Potentiometers".

Brochure: Penny + Giles "Technology Leaders in Displacement Monitoring & Manual Control".

Brochure: DC Hydrostar, "Position Transducer".

"An LVDT Primer", *Sensors*, Jun. 1996, pp. 27–30.

"Understanding Magnetostrictive LDTs", W.D. Peterson, *Hydraulics & Pneumatics*, Feb. 1993, pp. 32–34.

Brochure: Penny + Giles Product Data, "Cylinder Transducer Model HLP100".

Magazine: "Not Just a Blip on the Screen", *Business Week*, Feb. 19, 1996, pp. 64–65.

International Search Report from International Application No. PCT/US 02/15311, filed May 15, 2002. Date of report Aug. 5, 2002.

U.S. patent application No. 09/521,132, entitled "Piston Position Measuring Device," Filed Mar. 8, 2000.

U.S. provisional application No. 60/218,329, entitled "Hydraulic Valve Body With Differential Pressure Flow Measurement," filed Jul. 14, 2000.

U.S. patent application No. 90/521,537, entitled "Bi–Directional Differential Pressure Flow Sensor," filed Mar. 8, 2000.

U.S. provisional application No. 60/187,849, entitled "System For Controlling Multiple Hydraulic Cylinders," filed Mar. 8, 2000.

BI-DIRECTIONAL DIFFERENTIAL PRESSURE FLOW SENSOR

The present application is a Continuation of and claims priority of U.S. patent application Ser. No. 09/521,537, filed Mar. 8, 2000, and now abandoned the content of which is hereby incorporated by reference in its entirety.

BACKGROUND OF THE INVENTION

The present invention relates to a bi-directional flow sensor used to measure flow rate of a fluid flow. More particularly, the present invention relates to a differential pressure flow sensor of the type using a flow restriction member to produce a pressure drop within the fluid flow, a measurement of which can be used to establish the direction and flow rate of a fluid flow.

Fluid flow sensors can be used in many different applications, such as in industrial process control environments, to measure flow rates of process fluids (liquids and gases) and provide flow signals for flow indicators, controls, and flow volume metering. Differential pressure flow sensors measure the fluid flow rate in a pipe or conduit by measuring a pressure drop across a discontinuity within the pipe. One way to form the discontinuity is to place a flow restriction member or primary element within the pipe to produce the desired pressure drop. One such flow restriction member is an orifice plate that restricts the fluid flow and produces the measured pressure drop. An example of an orifice plate is the orifice restriction used in Model 1195 Integral Orifice produced by Rosemount, Inc. of Eden Prairie, Minn. These flow restriction members are generally uni-directional allowing for flow rate measurements of fluid flows moving in a single direction.

Typical flow rate measuring systems tap the pipe containing the fluid flow on either side of the flow restriction member and measure the pressure at each tap and use an external pressure sensor to obtain the pressure drop. Impulse or gauge lines filled with fluid communicate the pressure at each tap to the external pressure sensor. Such systems have relatively high installation costs due to the need to attach an external pressure sensor to the pipe, and to provide leakage protection at the locations where the pipe is tapped. Additionally, impulse lines attenuate the pressure signals and introduce delays thereby reducing the sensitivity and responsiveness of the flow measurement. Also, in gas applications, condensing gases in the impulse lines can cause erroneous readings. Furthermore, the use of impulse lines can also render these types of flow measuring systems sensitive to their position. As a result, they must be recalibrated each time their position changes.

SUMMARY OF THE INVENTION

A bi-directional differential pressure flow sensor is provided that is configured to establish a direction and flow rate of a fluid flow. The flow sensor includes a flow restriction member, a differential pressure sensor, and processing electronics. The flow restriction member is configured to produce a pressure drop when placed inline with the fluid flow. The differential pressure sensor is embedded or integral with the flow restriction member and produces a differential pressure signal that is indicative of the pressure drop. The processing electronics produces a flow rate signal that is indicative of the direction and flow rate of the fluid flow as a function of the differential pressure signal.

BRIEF DESCRIPTION OF THE DRAWINGS

FIG. 14 is a cross-sectional view of another embodiment of the invention.

DETAILED DESCRIPTION

The present invention provides a bi-directional differential pressure flow sensor, in which components of a differential pressure sensor are integral with the flow restriction member. The flow sensor can be placed inline with the fluid flow such that the flow restriction member produces a pressure drop which can be sensed by the differential pressure sensor. The differential pressure sensor is configured to produce a pressure signal that is indicative of the sensed pressure drop. Processing electronics, coupled to the differential pressure sensor, is adapted to produce a flow rate signal that is indicative of the magnitude and direction of a flow rate of the fluid flow as a function of the differential pressure signal.

Figure 1:
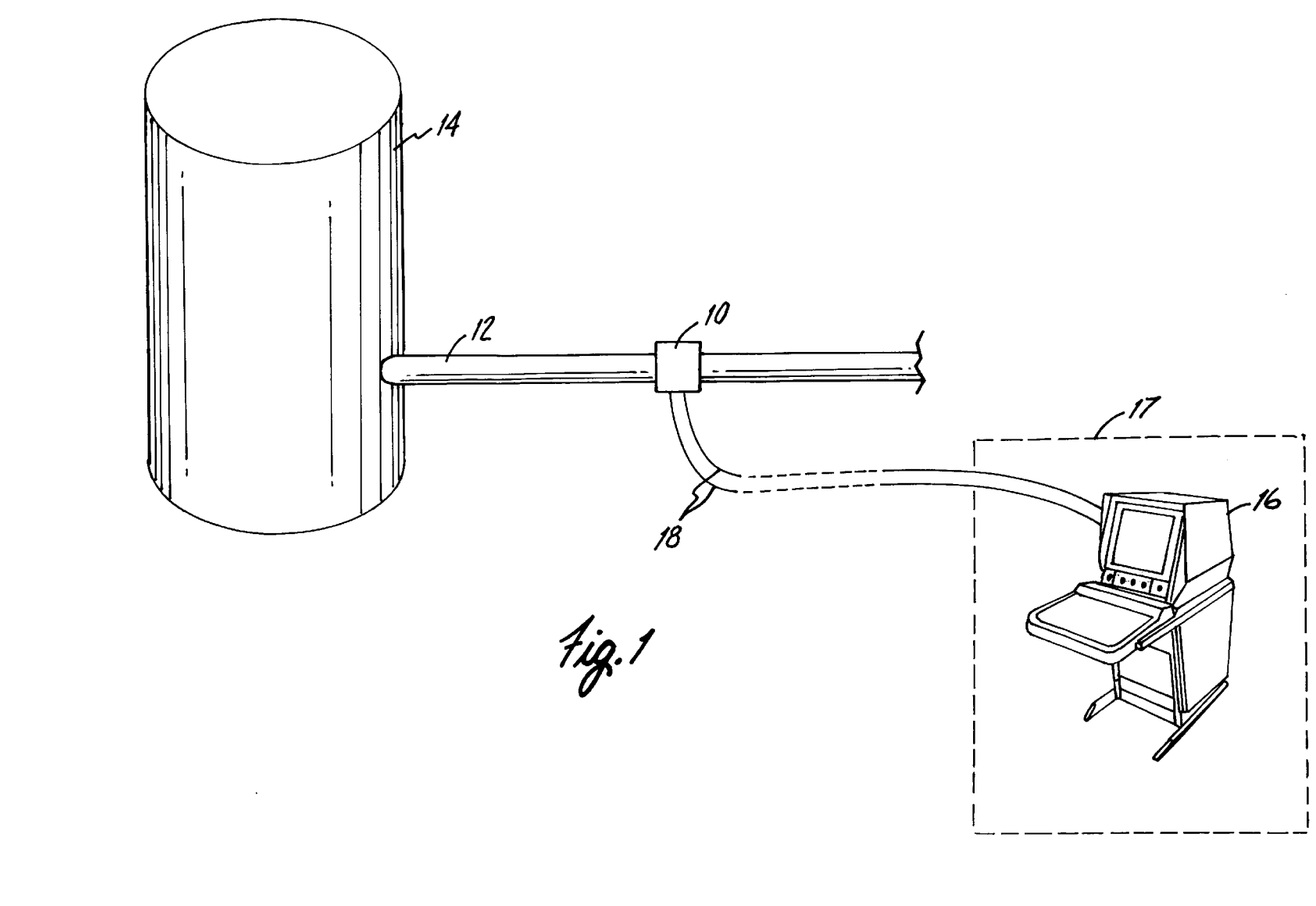
FIG. 1 is a simplified diagram showing a flow sensor attached to a pipe in a process plant.

FIG. 1 depicts an example of a processing plant and illustrates an environment in which the flow sensor of the present invention, generally designated as 10, can be used. Flow sensor 10 is installed inline with pipe 12 to produce and sense a pressure drop which can be used to determine the flow rate of a fluid flow through pipe 12 and into and out of process tank 14. The fluid flow can be of liquid or gas. Flow sensor 10 can be electronically coupled to control system 16 or other processing electronics, over two-wire control loop 18. Control system 16 is typically remotely located in control room 17 of the processing plant. Control system 16 can be configured to control, and receive flow-related information from, flow sensor 10 over two-wire control loop 18 using a standard 4–20 mA analog signal, or a digital signal in accordance with a digital communication protocol such as Highway Addressable Remote Transducer (HART®), FOUNDATION™ Fieldbus, Profibus PA, Profibus DP, Device Net, Controller Area Network (CAN), Asi, and other digital communication protocols commonly used in the industry. Additionally, flow sensor 10 can be a low power flow sensor, which is completely powered by energy received over control loop 18.

The flow rate signal produced by flow sensor 10 is indicative of the flow rate of the fluid flow as well as its direction. For example, if the flow rate signal is an analog signal (4–20 mA), the flow rate and the direction of the fluid flow can be indicated-by the magnitude of the signal. A flow rate of zero can be indicated by zero flow rate magnitude, such as a current magnitude of 12 mA. A fluid flow moving in a negative direction, or a negative fluid flow, can be indicated by a flow rate signal having a current magnitude of less than the zero flow rate magnitude. A positive fluid flow can be indicated by a flow rate signal having a current magnitude that is greater than the zero flow rate magnitude. The difference between of the magnitude of the flow rate signal and the zero flow rate magnitude can be used to establish the flow rate of the positive or negative fluid flows. For example, an increase in the difference between magnitude of the flow rate signal and the zero flow rate magnitude could indicate an increase in the flow rate of the positive or negative fluid flow. Also, the digital protocols mentioned above can also communicate the direction and flow rate of the fluid flow.

Figure 2:
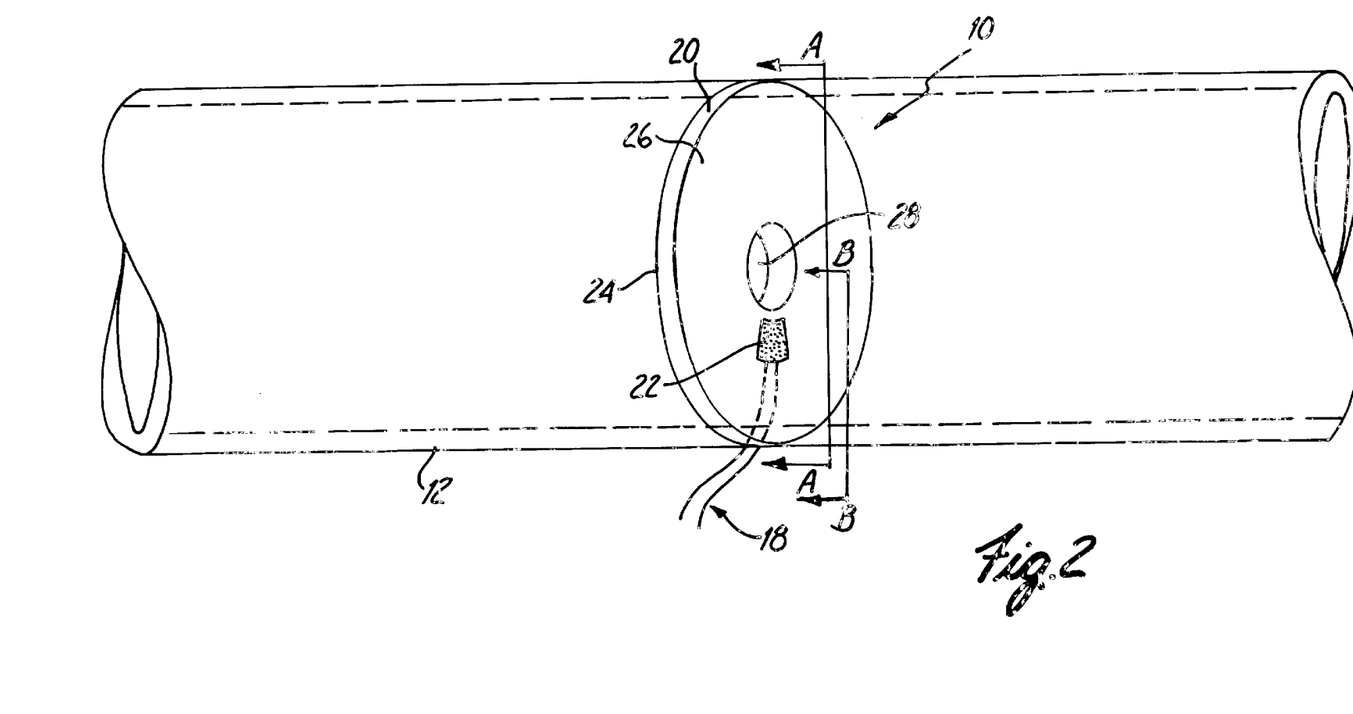
FIG. 2 shows a flow sensor, in accordance with one embodiment of the invention, positioned within a pipe.

FIG. 2 shows a simplified illustration of one embodiment of flow sensor 10 within pipe 12. Flow sensor 10 generally includes flow restriction member or primary element 20 and differential pressure sensor 22 embedded in or integral with flow restriction member 20. In general, flow restriction member 20 is a bi-directional flow restriction member that forms a discontinuity within the fluid flow which produces a pressure drop across first and second sides 24, 26 of flow restriction member 20. A positive pressure drop occurs when the pressure at first side 24 is greater than the pressure at second side 26. The positive pressure drop relates to a positive fluid flow or a fluid flow moving from left to right or from first side 24 to second side 26. A negative pressure drop occurs when the pressure at first side 24 is less than the pressure at second side 26. The negative pressure drop relates to a negative fluid flow or a fluid flow moving from right to left or from second side 26 to first side 24. The greater the magnitude of the pressure drop the faster the flow rate of the fluid flow. As a result, the pressure drop is indicative of both the direction of the fluid flow and its flow rate. Those skilled in the art will appreciate that many different forms of flow restriction member 20 could be used to produce the desired pressure drop. These include, for example, orifice plates having concentric and eccentric orifices, plates without orifices, wedge elements consisting of two non-parallel faces which form an apex, or other commonly used flow restriction members.

The embodiment of flow restriction member 20 shown in FIG. 2, includes fluid flow passageway or orifice 28 extending between first and second sides 24, 26. Flow restriction member 20 is placed inline with a fluid-flow through pipe 12 forcing the fluid flow to, travel through fluid flow passageway 28 resulting in a pressure drop across first and second sides 24, 26 of flow restriction member 20. Differential pressure sensor 22 is configured to sense the pressure at both first and second sides 24, 26 of flow restriction member 20 and produce a differential pressure signal that is indicative of the pressure drop or pressure difference between first and second sides 24, 26. As a result, the differential pressure signal can be used to calculate the direction of the fluid flow and its flow rate.

Figures 3A, 3B, 3C:
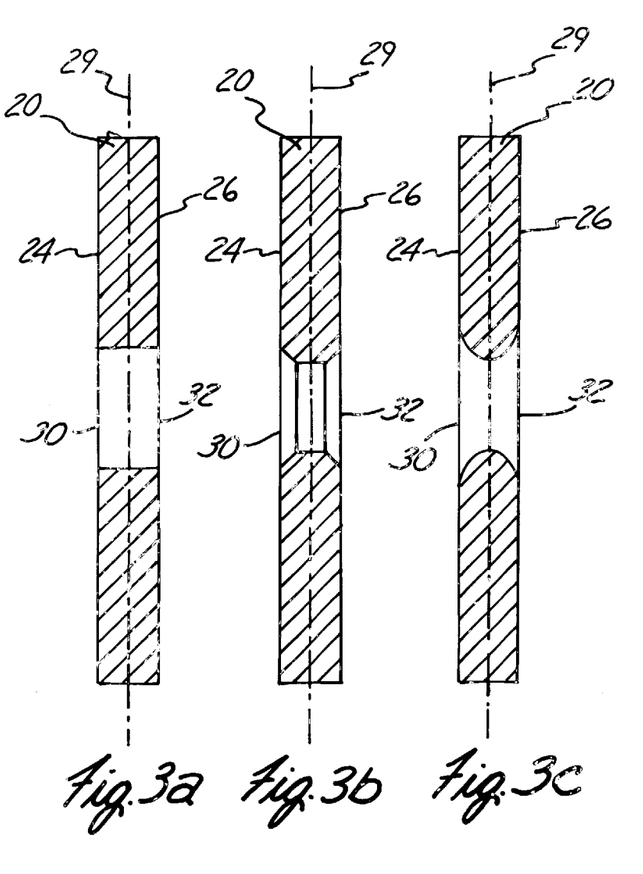
FIGS. 3a–3c are cross-sectional views of embodiments of a flow restriction member taken along line A—A of FIG. 2 with some elements removed.

FIGS. 3a–3c show cross-sectional views of various embodiments of flow restriction member 20 taken at line A—A of FIG. 2. Differential pressure sensor 22 is not shown to simplify the illustrations. Fluid flow passageway 28 is symmetric about axis 29 and is defined by first and second throat portions 30, 32 corresponding to first and second sides 24, 26, respectively. These embodiments of flow restriction member 20, allow flow sensor 10 to operate in bi-directional fluid flows. In FIG. 3a, throat portions 30, 32 of flow restriction member 20 are perpendicular to first and second sides 24, 26. Alternatively, first and second throat portions 30, 32 can be tapered toward the center of fluid flow passageway 28, as shown in FIGS. 3b and 3c.

Figure 4:
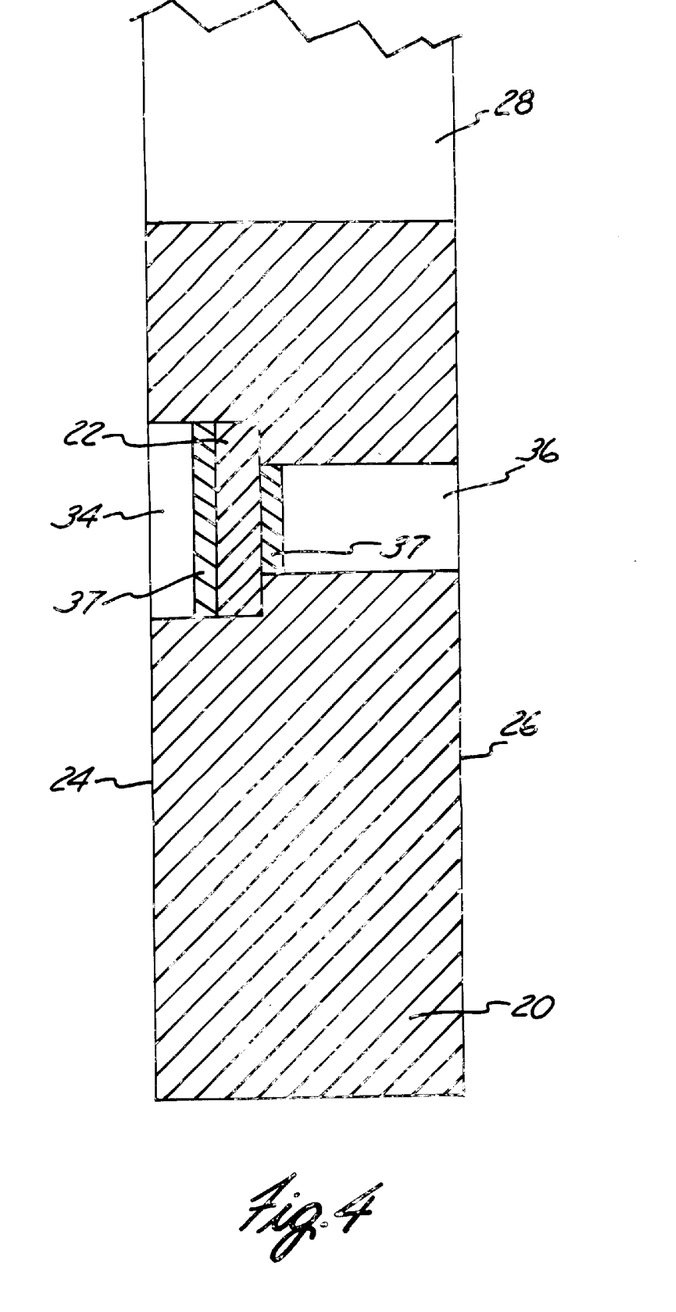
FIGS. 4–6 are cross-sectional views of embodiments of the invention taken along line B—B of FIG. 2.
Figure 5:
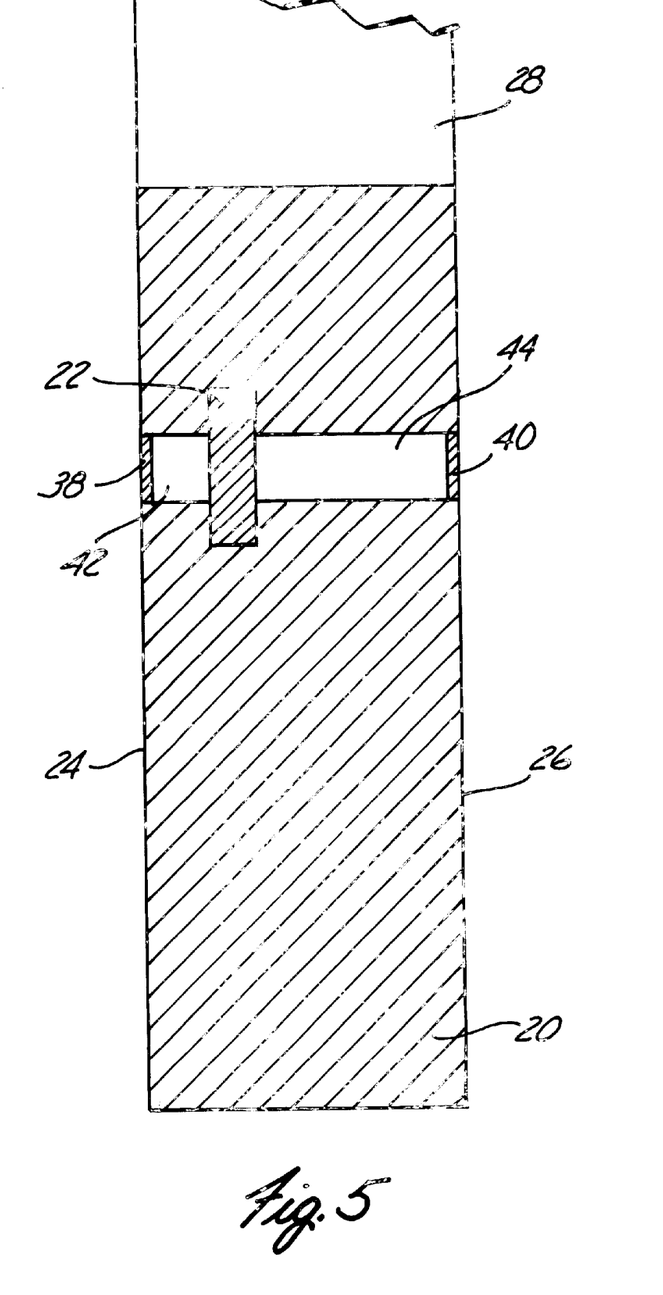
Figure 6:
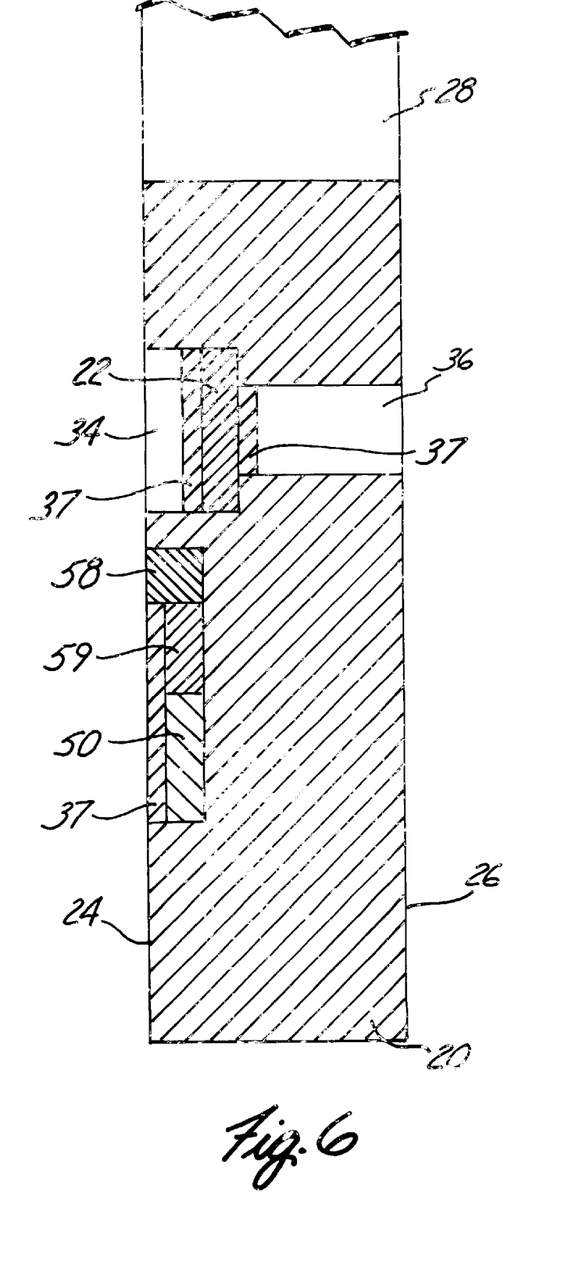

Flow sensor 10 integrates differential pressure sensor 22 with the flow restriction member 20 to form a single unit which can be positioned inline with a fluid flow. FIGS. 4–6 show cross-sectional views of various embodiments of flow sensor 10 taken along line B—B of FIG. 2. In each of the depicted embodiments, differential pressure sensor 22 measures the pressure drop across flow restriction member 20 by coupling differential pressure sensor 22 to the pressures at first and second sides 24 and 26. Differential pressure sensor 22 could be, for example, a piezoresistive differential pressure sensor, which operates on strain gauge technology, a capacitance-based differential pressure cell, in which the capacitance of differential pressure sensor 22 changes as a function of the pressure drop, or any other suitable differential pressure sensor commonly used in the industry. Differential pressure sensor 22 produces a pressure signal that is indicative of the pressure drop which can be provided to processing electronics to calculate the flow rate of the fluid flow.

In one embodiment of flow sensor 10, differential pressure sensor 22 is coupled to the pressures at first and second sides 24, 26 through first and second openings 34, 36, respectively, as shown in FIG. 4. Since this embodiment does not use impulse lines or fill fluid to couple to the pressures at first and second sides 24, 26, it is insensitive to position. As a result, this embodiment of differential pressure sensor 22 can be moved without having to recalibrate flow sensor 10. Differential pressure sensor 22 can be isolated from the fluid in pipe 12 by an isolator diaphragm or a coating 37 on the sides of differential pressure sensor 22 that are exposed to first and second openings 34, 36. Coating 37 is preferably impervious to the fluid to protect sensor 22. However, coating 37 should transfer the process pressure to sensor 22 and does not prevent differential pressure sensor 22 from sensing the pressure at first and second sides 24, 26. Any material that electrically insulates the sensor from the process fluid yet still transfers the fluid pressure to the sensor can be used. Examples of materials that could be used as coating 37 are grease or potting compounds.

In another embodiment of flow sensor 10, differential pressure sensor 22 is isolated from fluid flow by way of first and second diaphragms 38, 40 and corresponding first and second cavities 42, 44, as shown in FIG. 5. Cavities 42, 44 are preferably filled with a suitable fill fluid for transmitting the pressure sensed by first and second diaphragms 38, 40 at the respective first and second sides 24, 26 to differential pressure sensor 22. The fill fluid may include silicone, oil, glycerin and water, propylene glycol and water, or any other suitable fluid which preferably is substantially incompressible. This embodiment of the invention is somewhat sensitive to position, unlike the embodiment depicted in FIG. 4, due to the fill fluid. However, this sensitivity to position can be reduced by reducing the thickness of flow restriction member 20 or by positioning first and second diaphragms 38, 40 closer to differential pressure sensor 22.

Figure 7:
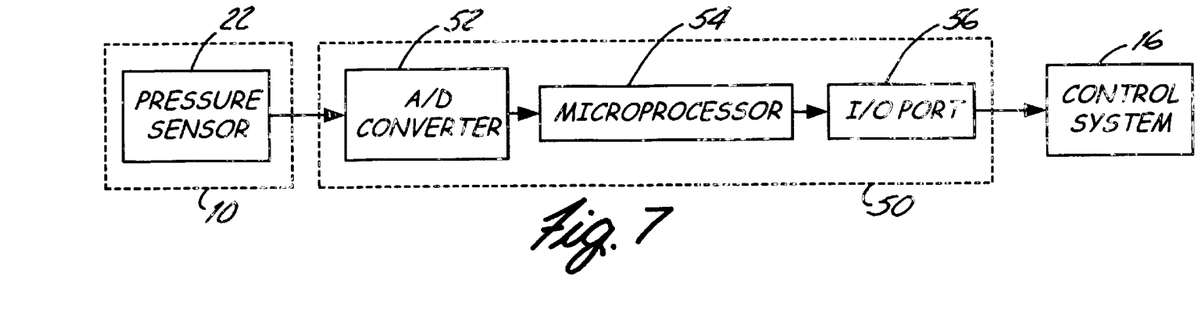
FIGS. 7 and 8 are simplified block diagrams of circuitry used to perform flow rate calculations in accordance with various embodiments of the invention.

FIG. 7 shows a simplified block diagram of one embodiment of processing circuitry 50 used by the present invention to produce a flow rate signal that is indicative of the direction and flow rate of the fluid flow. Here, differential pressure sensor 22 provides processing electronics 50 with the pressure signal that is indicative of the pressure drop across flow restriction member 20. Processing electronics 50 generally includes analog-to-digital (A/D) converter 52, microprocessor 54, and input/output (I/O) port 56. A/D converter 52 digitizes the pressure signal received from differential pressure sensor 22 and provides the digitized pressure signal to microprocessor 54. Microprocessor 54 is configured to establish the direction of the fluid flow by the sign of the pressure signal; either positive or negative. Microprocessor 54 is further configured to calculate the flow rate of the fluid flow as a function of the absolute value of the digitized pressure signal. For example, microprocessor 54 could use the following equations: to calculate mass flow rate ($Q_m$) and volume flow rate:

$$Q_m = NC_dY\frac{d^2}{\sqrt{1-\beta^4}}\sqrt{\rho h} \qquad Q_v = NC_dY\frac{d^2}{\sqrt{1-\beta^4}}\frac{\sqrt{h}}{\sqrt{\rho}}$$

($Q_v$):
Where:
- $Q_m$=mass flow rate
- $Q_v$=volumetric flow rate
- N=Units conversion factor (constant)
- $C_d$=primary element discharge coefficient (relates to the geometry of the throat)
- Y=gas expansion factor (Y=1.0 for liquids)
- d=primary element throat diameter
- $\beta$=primary element beta ratio (ratio of throat area to pipe area)
- $\rho$=fluid density
- h=absolute value of the differential pressure measured by differential pressure sensor 22.

Microprocessor 54 is further configured to produce a flow rate signal through I/O port 56 that is indicative of the direction and flow rate of the fluid flow. The flow rate signal can be delivered to a control system 16 (FIG. 1), as previously discussed. In one aspect of the invention, the differential pressure signal produced by differential pressure sensor 22 is provided as an output, which can be used to correct for errors, such as those due to spikes in the measurements. Such spikes can be problematic when using the invention to measure piston position in hydraulic systems as a function of flow of hydraulic fluid.

Figure 8:
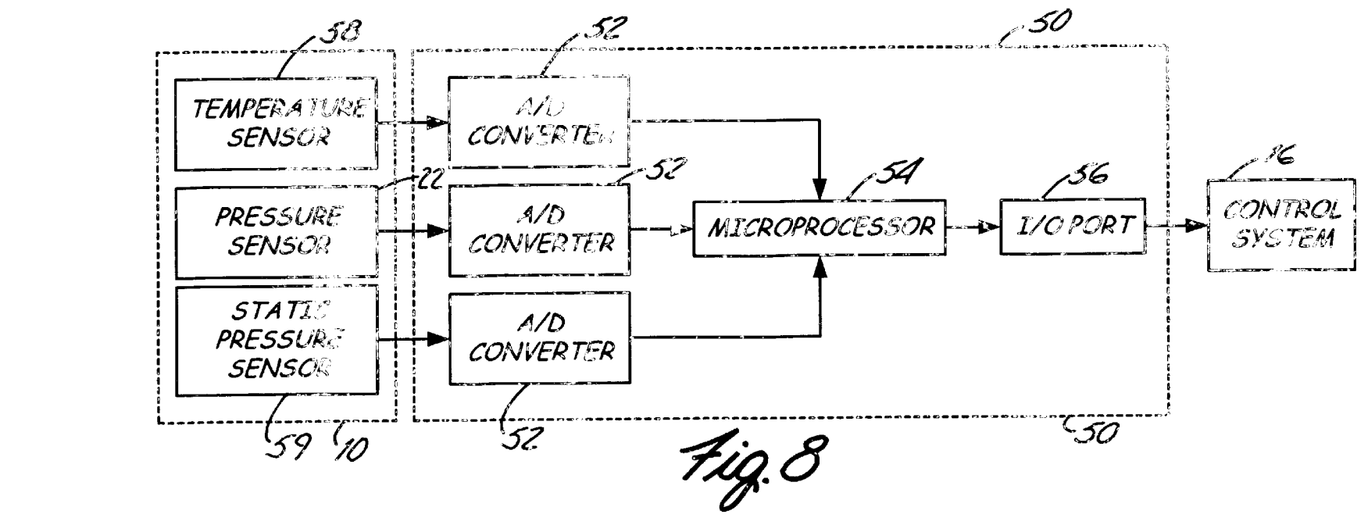

Referring back to FIG. 6, another embodiment of flow sensor 10 includes temperature sensor 58, which can be used to measure the temperature of the fluid flow and/or the operating temperature of differential pressure sensor 22. Temperature sensor 58 could be, for example, a resistive temperature detector (RTD) or other suitable temperature sensing device. Temperature sensor 58 is configured to produce a temperature signal that is indicative of the sensed temperature, which can be provided to processing electronics 50 at A/D converter 52, as shown in FIG. 8. A/D converter 52 digitizes the temperature signal and provides the digitized temperature signal to microprocessor 54. Microprocessor 54 can be configured to use the digitized temperature signal to perform various fluid parameter calculations, such as viscosity and density calculations, the results of which can be used by microprocessor 54 to calculate the flow rate of the fluid flow. Additionally, microprocessor 54 can use the temperature signal to provide temperature compensation to the pressure signal received from differential pressure transmitter 22. Microprocessor 54 can produce a flow rate signal that is indicative of the flow rate of the fluid flow as a function of the differential pressure signal and the temperature signal, that can be fed to other processing circuitry, such as to control system 16, through I/O port 56.

Yet another embodiment of flow sensor 10 includes static pressure sensor 59, shown in FIG. 6. Static pressure sensor 59 is configured to sense the line pressure of the fluid flow and produce a line pressure signal that is indicative of the sensed pressure. Due to the position of static pressure sensor 59, the line pressure signal could require correction for stagnation pressure effects. The line pressure signal can he used, for example, to calculate the density of a gas for use in gas flow rate calculations. Static pressure sensor 59 can be a piezoresistive pressure sensor or a capacitance-based pressure sensor. Coating 37 can be used to protect static pressure sensor 59 from the fluid flow if necessary. Alternatively, static pressure sensor 59 can be isolated from the fluid flow using an diaphragm with an oil fill fluid.

The line pressure signal produced by static pressure sensor 59 can be provided to processing electronics 50 as a parameter that can be used to calculate the flow rate of the fluid flow, as indicated in FIG. 8. The line pressure signal is received by processing electronics 50 at A/D converter 52, which provides the line pressure signal to microprocessor 54 in a digital form. Microprocessor 54 can produce a flow rate signal that is indicative of the flow rate of the fluid flow as a function of the differential pressure signal from differential pressure sensor 22 and the line pressure signal. The flow rate, line pressure, differential pressure or temperature signals can be fed to other processing circuitry, such as to control system 16, through I/O port 56. Another embodiment of flow sensor 10 includes processing electronics 50, as shown in FIG. 6. Here, processing electronics 50 is embedded in or integral with flow restriction member 20. Processing electronics 50 is placed in electronic communication with differential pressure sensor 22 to receive the differential pressure signal, as shown in FIG. 7. Processing electronics 50 can be further configured to receive signals from temperature sensor 58 and/or static pressure sensor 59, as indicated in FIG. 8. Processing electronics 50 can perform the various calculations discussed above relating to the flow rate of the fluid flow and fluid parameters.

Although FIG. 6 depicts flow sensor 10 as including temperature sensor 58, static pressure sensor 59, and processing electronics 50, the above-described embodiments of flow sensor 10 could include some, none, or all of these components.

Figure 9:
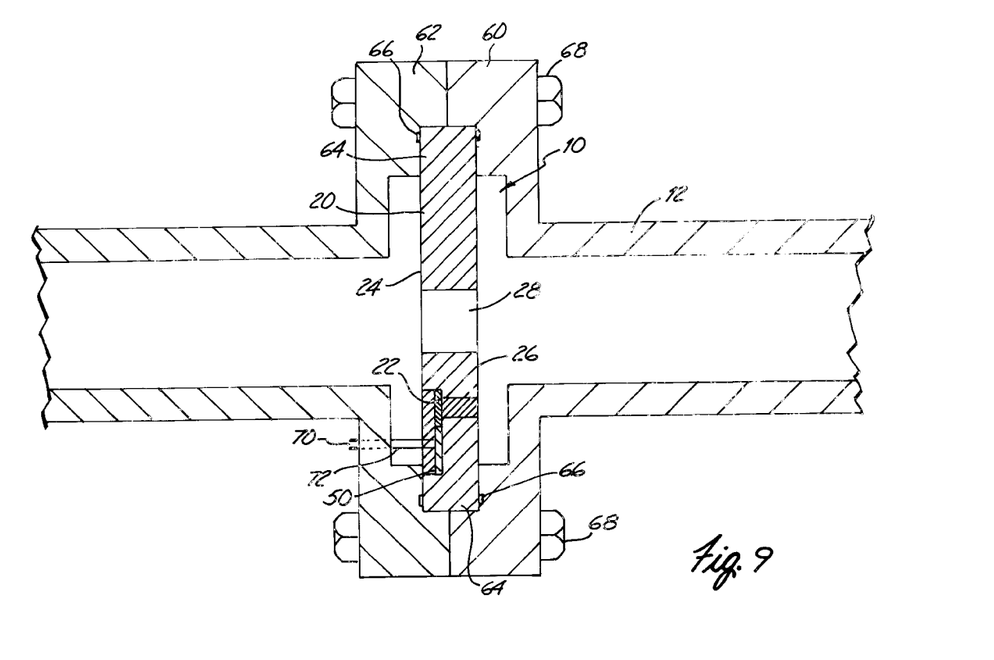
FIG. 9 is a cross-sectional view of a flow sensor installed in a pipe.

FIG. 9 shows an example of how flow sensor 10 can be installed in pipe 12. Pipe 12 is configured to include first and second flange portions 60, 62. Flow sensor 10 is sandwiched between first and second flange portion 60, 62 at peripheral edge portion 64 of flow sensor 10. O-rings 66 are compressed between peripheral edge portion 64 and first and second flange portion 60, 62 to provide leakage protection. Alternatively, O-rings 66 could be replaced with fiber gaskets, metal gaskets, or other suitable sealers. Bolts 68 secure the insulation of flow sensor 10. Signals produced by flow sensor 10, including a flow rate signal, a differential pressure signal, and signals relating to flow parameters such as temperature and line pressure, can be accessed at terminals 70 which electronically communicate with flow sensor 10 over wires 72.

Figure 10:
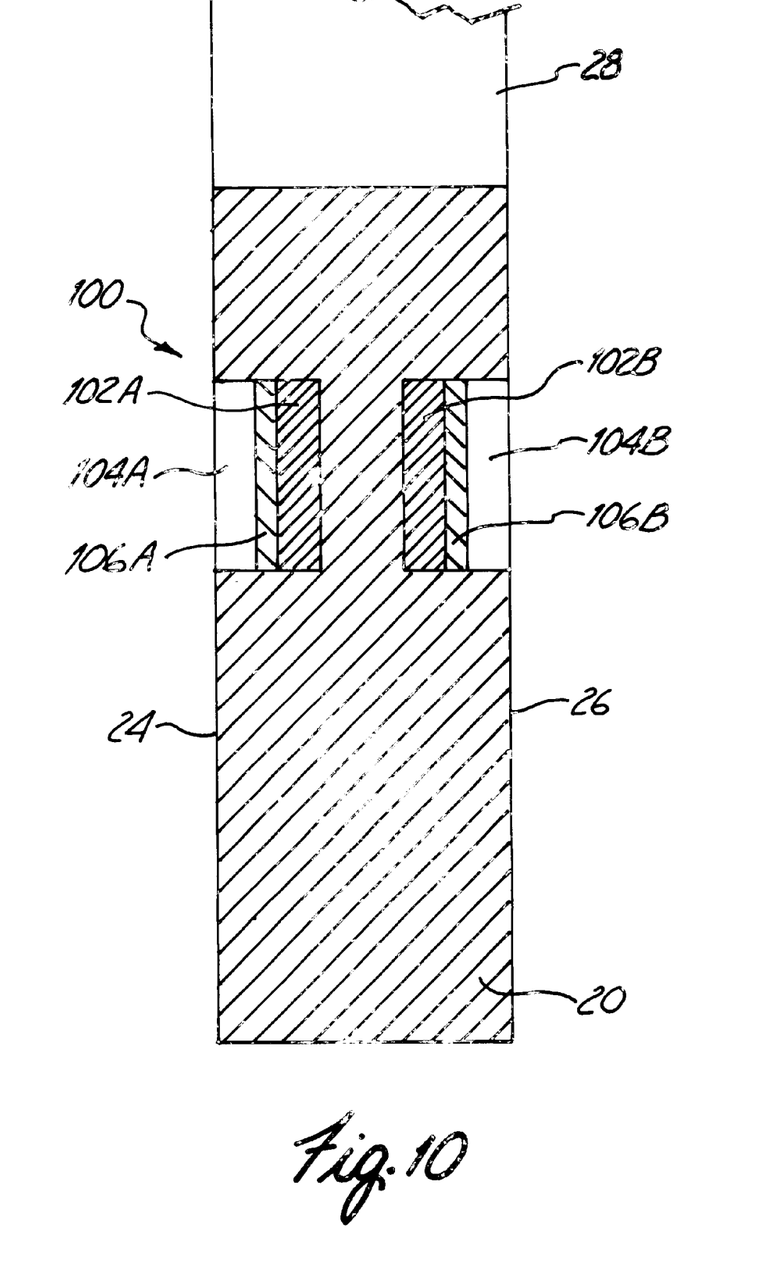
FIG. 10 is a cross-section view of another embodiment of the invention.

FIG. 10 illustrates another aspect of the invention. In FIG. 10, a differential pressure sensor 100 comprises two absolute or gauge pressure sensors 102A and 102B. The differential pressure is a function of a difference between the outputs from sensors 102A and 102B. Sensors 102A and 102B couple to process fluid through opening 104A and 104B across diaphragms or coatings 106A and 106B, respectively. The difference can be determined using analog circuitry or microprocessor 54.

Figure 11:
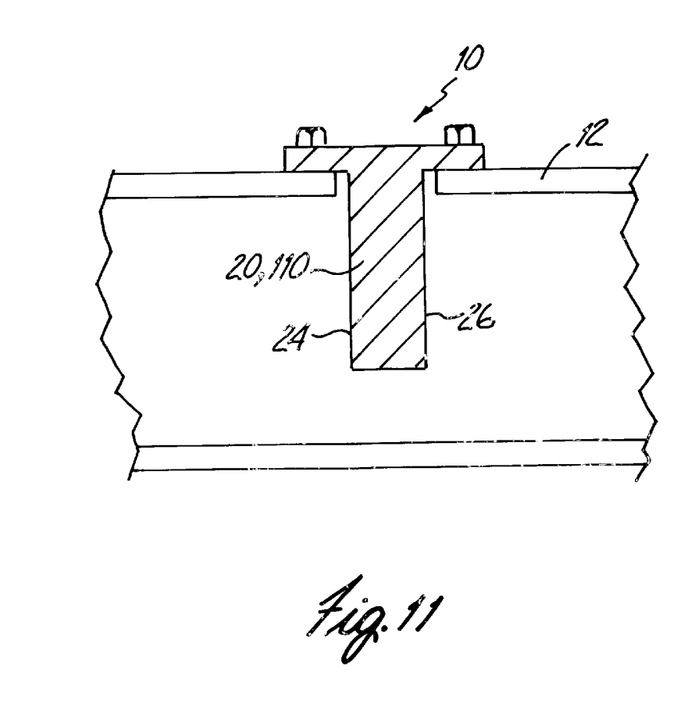
FIGS. 11 and 12 are cross-sectional views of other embodiments of the invention.
Figure 12:
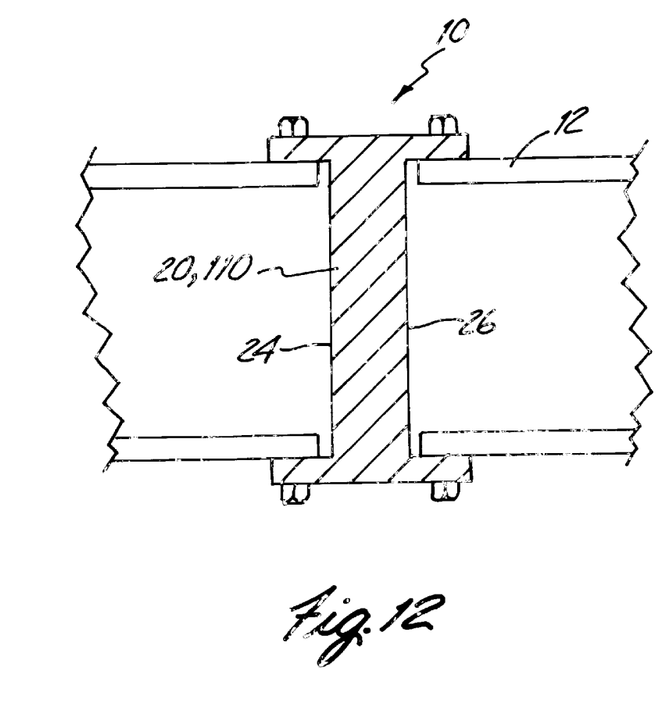
Figure 13A:
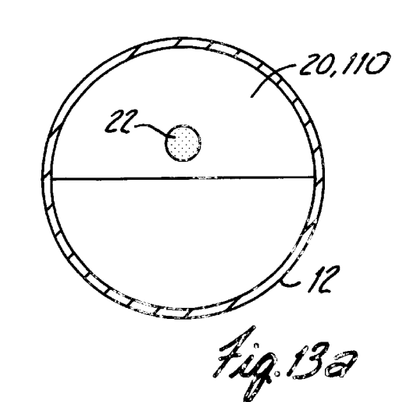
FIGS. 13a–f show flow restriction members in accordance with various embodiments of the invention.
Figure 13B:
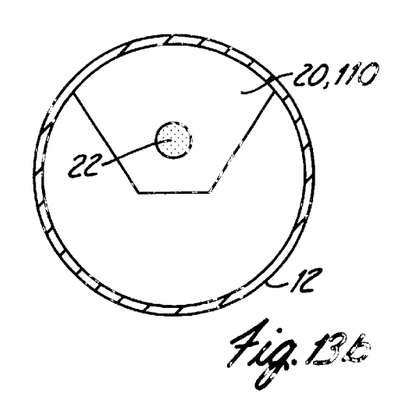
Figure 13C:
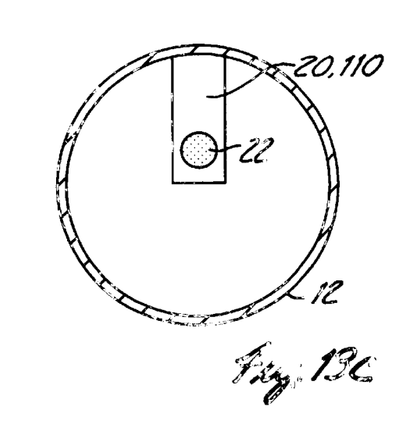
Figure 13D:
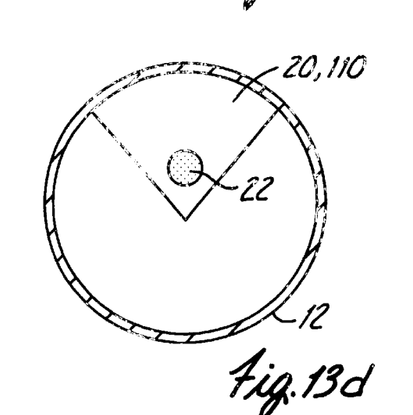
Figure 13E:
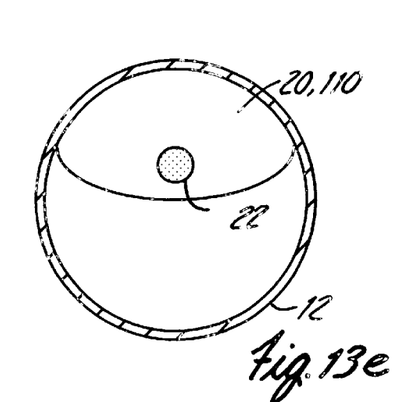
Figure 13F:
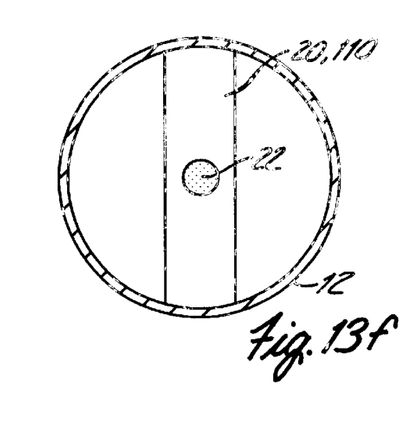

Another aspect of the invention is illustrated in FIGS. 11 and 12. Here, flow restriction member 20 includes a plate 110 that does not have an orifice, but is configured to operate in bi-directional fluid flows. Differential pressure sensor 22 and the other components of flow sensor 10 discussed above are not shown to simplify the illustrations. Here plate 110 attaches to pipe 12 and can extend either partially into (FIG. 11) or across (FIG. 12) fluid flow passageway 28 to produce the discontinuity in the fluid flow. The resulting pressure drop across first and second sides 24, 26 of plate 110 can be measured by differential pressure sensor 22 (not shown) which preferably embedded to plate 110, as discussed above. Additionally, these embodiments of flow sensor 10 can also include processing electronics 50, temperature sensor 58, and static pressure sensor 59, as in the previous embodiments of flow sensor 10. Although first and second sides 24, 26 are depicted as being parallel to each other, they can be non-parallel to each other as well to form wedge elements. FIGS. 13a–f show examples of plate 110 as seen by the fluid flow. Plate 110 can be shaped in many different ways to form the desired discontinuity in the fluid flow. These shapes include, for example, rhomboidal (FIG. 13b), rectangular (FIGS. 13c and f), triangular (FIG. 13d), semicircular (FIG. 13e), and other shapes.

Yet another aspect of the invention is illustrated in FIG. 14. In this embodiment, flow restriction member 20 includes first and second ports 112A and 112B corresponding to first and second sides 24, 26. First and second ports 112A, 112B couple the pressure at first and second sides 24, 26, respectively, to differential pressure sensor 22. Differential pressure sensor 22 is preferably a piezoresistive pressure sensor. This embodiment allows differential pressure sensor 22 to be located proximate the exterior of flow sensor 10, thereby providing easy access to differential pressure sensor 22. Flow restriction member 20 is depicted in FIG. 14 as being formed of first and second portions 114A and 114B with varying flow areas which constrict the fluid flow and form the desired discontinuity. However, the embodiments of flow restriction member 20 discussed above can also incorporate first and second pressure ports 112A and 112B to allow differential pressure sensor 22 to be positioned proximate the exterior surface of flow sensor 10. Bleed screws or Drain/vent valves (not shown) can be fluidically coupled to first and second ports 112A and 112B to release unwanted gas and fluid contained in first and second ports 112A and 112B. Seals 116 provide leakage protection and retain the static pressure in pipe 12.

In addition to being useful in the process control industry (FIG. 1), other applications can make use of the bi-directional flow rate measuring/monitoring capability of flow sensor 10. For example, flow sensor 10 could be used in hydraulic systems to determine the position of a piston contained within a hydraulic cylinder of a hydraulic actuator. Here the position of the piston within the hydraulic actuator is a function of the volume of hydraulic fluid contained within the hydraulic cylinder. The position of the piston is thus controlled by a hydraulic fluid flow that feeds hydraulic fluid into and out of the hydraulic cylinder. By connecting flow sensor 10 to the hydraulic fluid flow, the volume of hydraulic fluid in the hydraulic cylinder can be calculated. As a result, the position of the piston within the hydraulic cylinder can be determined as a function of the volume of the hydraulic fluid in the hydraulic cylinder.

Although the present invention has been described with reference to preferred embodiments, workers skilled in the art will recognize that changes may be made in form and detail without departing from the spirit and scope of the invention. For example, any type of pressure sensor, configuration of electronics or configuration of orifice plate can be used.

What is claimed is:

1. A bi-directional differential pressure flow sensor, comprising:
    a bi-directional flow restriction member adapted to produce a pressure drop when placed inline with a fluid flow;
    a differential pressure sensor embedded in the bi-directional flow restriction member and adapted to produce a differential pressure signal that is indicative of the pressure drop;
    embedded processing electronics embedded in the bi-directional flow restriction member and adapted to produce a flow rate signal that is indicative of a direction and a flow rate of the fluid flow as a function of the differential pressure signal, the embedded processing electronics including:
        an embedded analog to digital converter coupled to the differential pressure sensor and responsively providing a digital output related to the differential pressure signal;
        an embedded microprocessor coupled to the analog to digital converter and configured to calculate the flow rate as a function of the digital output; and
        an embedded I/O port coupled to the microprocessor and configured to couple to a two-wire process control loop, the I/O port further configured to transmit an output in the two-wire process control loop related to the calculated flow rate and to completely power the bi-directional differential flow sensor with power received from the two-wire process control loop.

2. The flow sensor of claim 1, wherein the bi-directional flow restriction member is an orifice plate having a fluid flow passageway extending between symmetric first and second throat portions.

3. The flow sensor of claim 1, including a temperature sensor embedded in the bi-directional flow restriction member and adapted to sense at least one of a temperature of the fluid flow and an operating temperature of the differential pressure sensor and to produce a temperature signal that is indicative of the sensed temperature.

4. The flow sensor of claim 3, wherein the flow rate signal is further a function of the temperature signal.

5. The flow sensor of claim 1, including a static pressure sensor embedded in the bi-directional flow restriction member and adapted to sense a line pressure of the fluid flow and produce a line pressure signal that is indicative of the sensed line pressure.

6. The flow sensor of claim 5, wherein the flow rate signal is further a function of the line pressure signal.

7. The flow sensor of claim 1, including:
    a temperature sensor embedded in the bi-directional flow restriction member and adapted to sense at least one of a temperature of the fluid flow and an operating temperature of the differential pressure sensor and to produce a temperature signal that is indicative of the sensed temperature; and
    a static pressure sensor embedded in the bi-directional flow restriction member and adapted to sense a line pressure of the fluid flow and produce a line pressure signal that is indicative of the sensed line pressure.

8. The flow sensor of claim 7, wherein the flow rate signal is further a function of the temperature signal and the line pressure signal.

9. The flow sensor of claim 1, wherein the differential pressure sensor is a piezoresistive differential pressure sensor.

10. The flow sensor of claim 1, wherein the differential pressure sensor is a capacitance-based pressure sensor.

11. The flow sensor of claim 1, wherein:

the bi-directional flow restriction member includes symmetric first and second sides having corresponding first and second openings; and the differential pressure sensor is exposed to the fluid flow at the first and second sides of the bi-directional flow restriction member through the first and second openings.

12. The flow sensor of claim 11, wherein the differential pressure sensor is isolated from the fluid flow by a coating.

13. The flow sensor of claim 12, wherein the coating is grease.

14. The flow sensor of claim 12, wherein the coating is a potting material.

15. The flow sensor of claim 1, wherein:

the bi-directional flow restriction member includes symmetric first and second sides having corresponding first and second openings filled with a fill fluid and sealed with first and second flexible diaphragms, respectively; and the differential pressure sensor is exposed to the fill fluid in the first and second cavities; whereby the differential pressure sensor is isolated from the fluid flow and coupled to the pressure drop through the fill fluid.

16. The flow sensor of claim 1, wherein the flow rate signal is in accordance with one of an analog communication protocol and a digital communication protocol.

17. The flow sensor of claim 16, wherein the flow rate signal is in accordance with a digital communication protocol selected from the group consisting of Highway Addressable Remote Transducer (HART®), FOUNDATION™ Fieldbus, Profibus PA, Profibus DP, Device Net, Controller Area Network (CAN), and Asi communication protocols.

18. The flow sensor of claim 16, wherein the flow rate signal is a 4–20 mA analog signal.

19. The flow sensor of claim 1, wherein:

the bi-directional flow restriction member includes symmetric first and second sides; and the differential pressure sensor includes first and second pressure sensors adapted to produce first and second pressure signals indicative of first and second pressures corresponding to the first and second sides, respectively;

the differential pressure signal is a function of a difference between the first and second pressure signals.

20. The flow sensor of claim 1, further including an output related to a process variable.

21. The flow sensor of claim 20, wherein the process variable is selected from the group of process variables consisting of temperature, static pressure and differential pressure.

22. The flow sensor of claim 1, wherein the bi-directional flow restriction member includes a plate that extends into the fluid flow.

23. The flow sensor of claim 1, wherein the bi-directional flow restriction member includes a plate that extends across the fluid flow.

24. The flow sensor of claim 23, wherein the plate has a shape, as viewed by the fluid flow, that is selected from the group consisting of rhomboidal, rectangular, triangular, and semicircular.

25. The flow sensor of claim 1, wherein the bi-directional flow restriction member includes first and second pressure ports, the first and second pressure ports couple the pressure drop to the differential pressure sensor, whereby the differential pressure sensor can sense the pressure drop.

26. The differential pressure flow sensor of claim 1, wherein the flow rate signal is further a function of at least one of temperature and line pressure.

* * * * *